Figure 6:
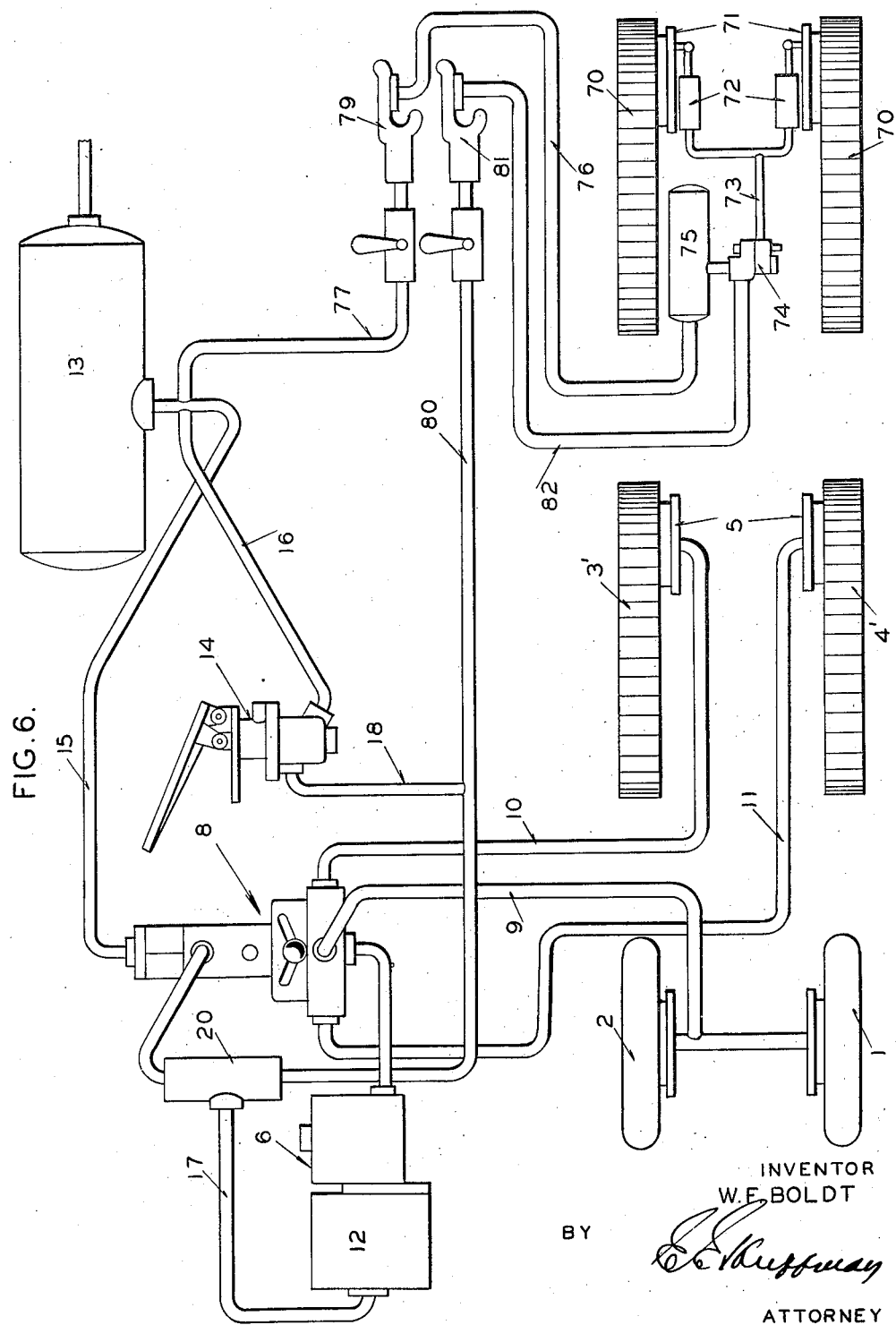

Jan. 2, 1945. W. F. BOLDT 2,366,310
COMBINED AIR-HYDRAULIC ACTUATING SYSTEM
Filed Jan. 7, 1943 3 Sheets-Sheet 1
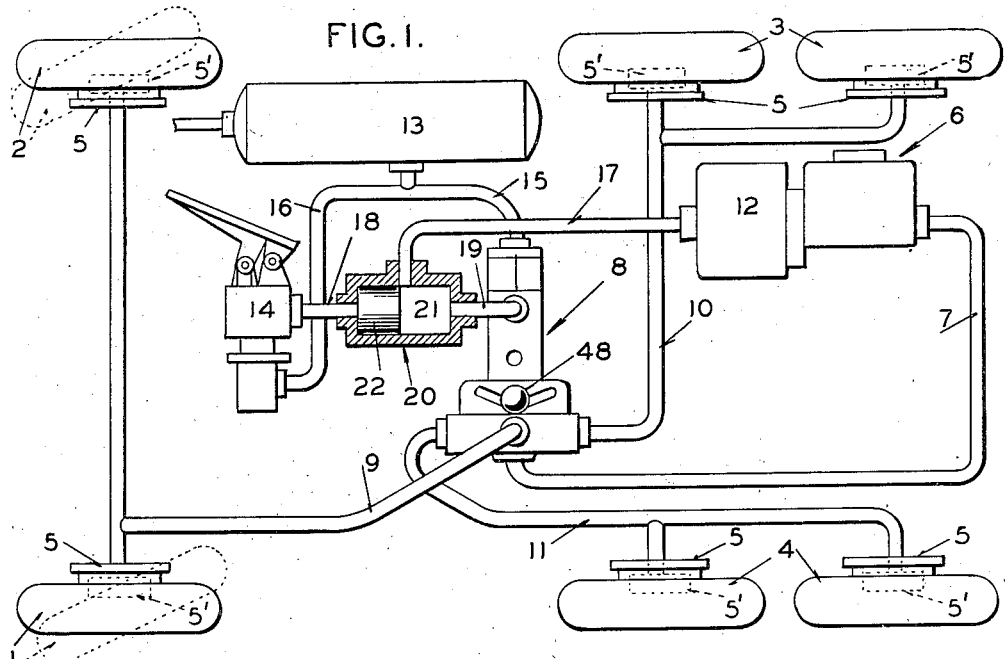
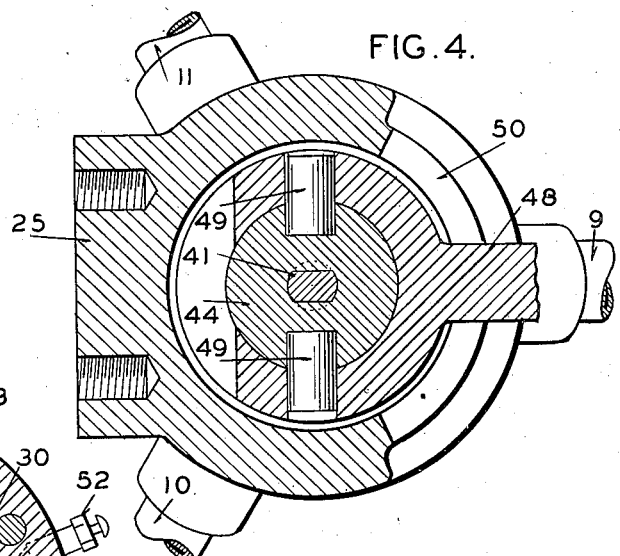
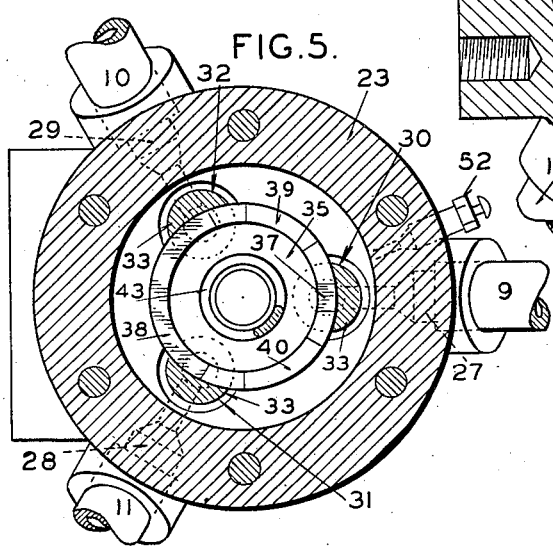
INVENTOR
W. F. BOLDT
BY
ATTORNEY

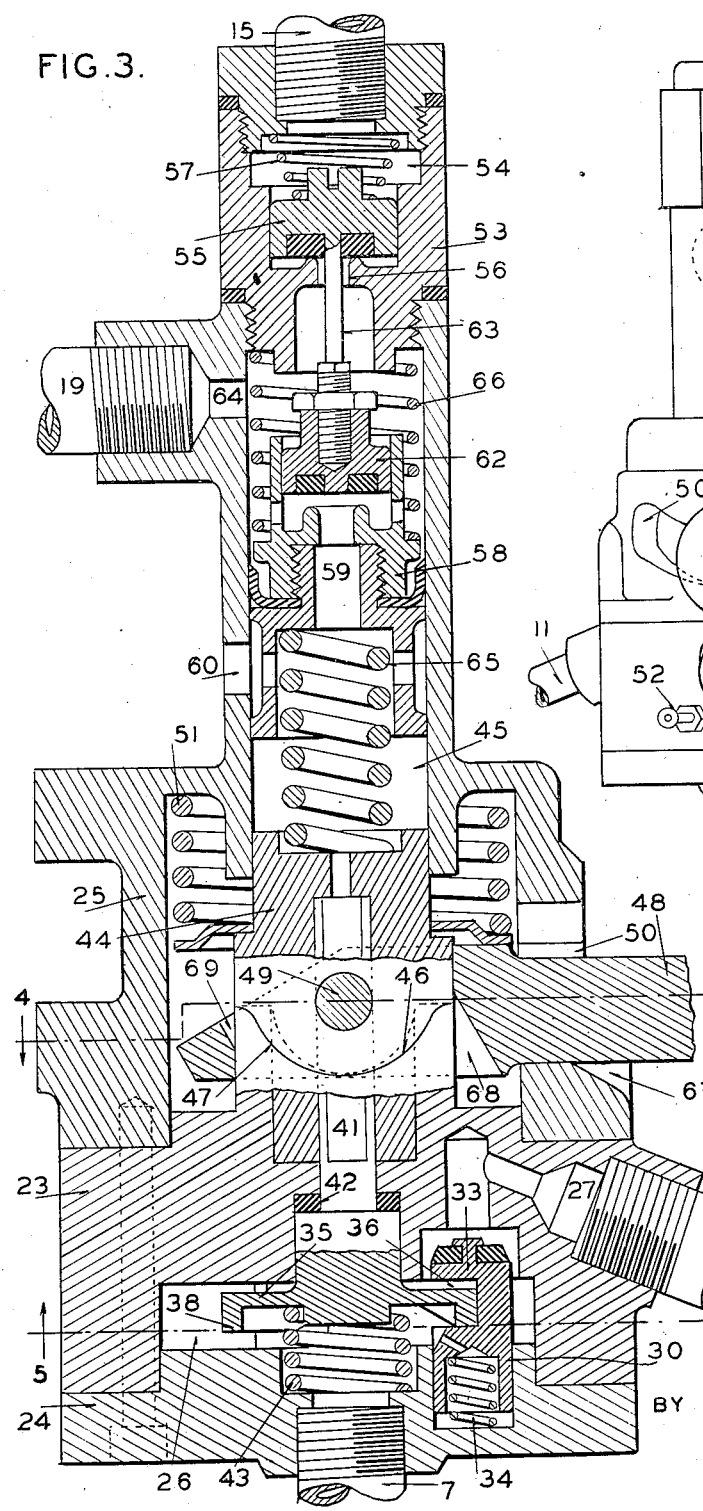
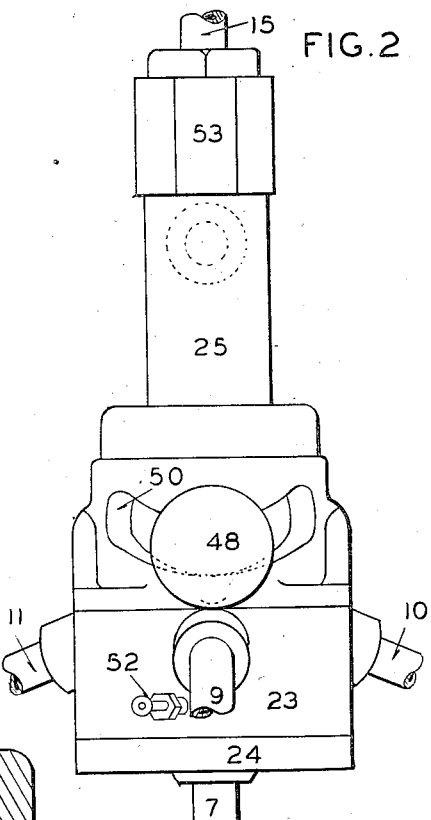

INVENTOR
W. F. BOLDT
BY
ATTORNEY

Patented Jan. 2, 1945

2,366,310

UNITED STATES PATENT OFFICE 2,366,310

COMBINED AIR-HYDRAULIC ACTUATING SYSTEM

Werner F. Boldt, Clayton, Mo., assignor to Wagner Electric Corporation, St. Louis, Mo., a corporation of Delaware Application January 7, 1943, Serial No. 471,552

19 Claims. (Cl. 188—152)

My invention relates to actuating systems and more particularly to one in which both air and liquid under pressure is employed.

One of the objects of my invention is to produce an air-hydraulic actuating system including an improved combined hydraulic selector valve and air control valve mechanism which will permit the simultaneous actuation of a plurality of devices or the selective actuation of certain of said devices only.

Another object of my invention is to produce an improved selector and control valve mechanism for use in a combined air-hydraulic actuating system which will permit said system to be controlled in a desired manner by a single control member.

Still another object of my invention is to produce an improved actuating system in which air pressure is employed to develop hydraulic pressure for operating a plurality of devices and to embody in said system a valve mechanism permitting control of the air pressure and/or selective operation of the devices by a single manually operable member.

A more specific object of my invention is to produce an improved combined air-hydraulic actuating system for the brakes of a vehicle or vehicles which will permit the operator to so control the brakes thereof that they can be an aid to steering.

Other objects of my invention will become apparent from the following description taken in connection with the accompanying drawings in which Figure 1 is a schematic view of a braking system for a vehicle in which my invention is embodied; Figure 2 is a front view of my improved control valve mechanism; Figure 3 is a longitudinal sectional view of the combination valve mechanism; Figures 4 and 5 are sectional views taken on the lines 4—4 and 5—5, respectively, of Figure 3; and Figure 6 is a schematic view showing how the braking system can also be employed on a tractor-trailer vehicle.

Referring to the drawings in detail and first to Figure 1, there is shown a braking system for a vehicle having dirigible wheels 1 and 2 for steering, right hand driving wheels 3, and left hand driving wheels 4. Each of the wheels is shown as being provided with a braking assembly 5 actuated by a hydraulic fluid motor 5'. The source of hydraulic pressure is a master cylinder device 6 of known construction. The outlet of this master cylinder is connected to a conduit 7 which leads to my improved combination control valve mechanism 8 shown in detail in Figures 2, 3, 4, and 5 to be later described in detail. Leading from this valve mechanism is a conduit 9 connected to the fluid motors of the dirigible wheel brakes. Conduits 10 and 11 also lead from the valve mechanism, the former being connected to the fluid motors of the brakes on the right driving wheels 3 and the latter to the fluid motors of the brakes on the left driving wheels 4.

The master cylinder device is adapted to be operated by a power cylinder 12 which is operated by air under pressure from a suitable source such as reservoir 13. Communication between the air reservoir and the power cylinder is permitted through either a part of the control valve mechanism 8 or through a foot-controlled valve 14. Conduit 15 leads from the reservoir to the valve mechanism 8 and another conduit 16 leads from the reservoir to the foot-controlled valve which may be of any desired construction but preferably of the metering type. The power cylinder 12 is connected to the valve mechanism 8 and the foot-controlled valve by means of a common conduit 17, branch conduits 18 and 19, and a two-way valve 20. This two-way valve comprises a cylinder 21 and a floating piston valve 22. When the foot-controlled valve is opened to admit air to the branch conduit 18, the piston of the two-way valve will close off conduit 19 and connect conduit 18 to conduit 17 and the power cylinder and when air is admitted to conduit 19 through valve mechanism 8, piston 22 will close off conduit 18 and connect conduit 19 to conduit 17 and the power cylinder.

Referring now to Figures 2, 3, 4, and 5, the details of the combination control valve mechanism 8 will be described. This mechanism has a main body member 23, a bottom plate 24, and a top casing member 25. The body member and bottom plate member are so formed as to provide a chamber 26 therebetween to which is connected conduit 7 coming from the outlet of the master cylinder device 6. This chamber 26 has three outlet passages 27, 28, and 29 (see Figure 5) arranged 180 degrees apart in the body member 23. The outlet passage 27 is connected with conduit 9 leading to the front brakes and passages 28 and 29 are connected to conduits 11 and 10, respectively, leading to the rear brakes. Passages 27, 28, and 29 have shut-off valves 30, 31, and 32 associated therewith.

As best shown in Figure 3, each of these shut-off valves comprises a plunger 33 slidably mounted in the bottom plate 24. The plungers are spaced 180 degrees apart with their axes parallel with the vertical axis of the body member. A spring 34 biases each plunger toward seated or closed position. The valves are controlled by a disc cam 35 mounted in the body member 23 with its peripheral portion being received in cross-notches 36 in the valve plunger so that the cam surfaces, which are formed as flanges on the disc, may cause the plungers to be reciprocated. As best shown in Figures 3 and 5, the disc cam has a short high portion 37 cooperating with the plunger of valve 30 and a long high portion 38 extending over approximately 120 degrees for cooperation with the plungers of valves 31 and 32. Between the high portions 37 and 38 are low portions 39 and 40.

When the disc is in its normally inoperative position, as shown in the figures, the high portions thereof will be so positioned that all the plungers of the valves will be held in unseated position. If the disc should be turned in a clockwise direction, as viewed in Figure 5, the plungers of valves 30 and 31 will be moved to valve closed position by the action of springs 34 due to the fact that the low portions 39 and 40 of the cam are moved into the slots of the plungers. If the disc should be moved in a counter-clockwise direction, then the plungers of valves 30 and 32 will be moved to closed positions by the springs due to the fact that the low portions 39 and 40 are moved into the slots of said plungers.

The disc is provided with a stem 41 which extends through the body member 23 and into the casing member 25 and in order to seal the stem, a sealing washer 42 is provided which is compressed by a spring 43 acting on the disc and positioned between said disc and the bottom plate. The inner end of the stem has a rectangular cross-section and is received in a rectangular opening in a member 44. This member is journaled in the body member 23 and in the inner end of a cylinder 45 in casing 25 for both rotative and axial movement. The end of member 44 adjacent the body member 23 is formed with a cam surface 46 for cooperation with a complementary cam surface 47 carried by the body member (see Figure 3). The member 44 is adapted to be turned by a lever or handle 48 which is pivoted to said member by pins 49 (Figure 5), said handle projecting through a curved slot 50 in the wall of the casing member 25 in order to be accessible from the exterior. A spring 51 mounted in the casing member 25 is adapted to act on member 44 to hold the cooperating cam surfaces 46 and 47 in engagement with each other. Said spring also acts on the handle to bias it into engagement with the lower edge of the slot and hold it in proper extended position.

When the handle is in the central part of the slot, cam surfaces 46 and 47 on member 44 and body member 13 will be in complementary engagement and disc 35 will have the position shown in Figure 5 wherein all the shut-off valves are in open position. If the handle should be moved to the right, as viewed in Figure 2, member 44 will be rotated and also disc 35. This will position the disc so that valves 30 and 31 become closed, valve 32 remaining open. The cam surfaces 46 and 47 will cause member 44 to move upwardly and compress spring 51. If, after moving the handle to the right, the operator should release said handle, spring 51 acting through cam surfaces 46 and 47 will return the handle to its central position. The disc also returns to the position wherein all the shut-off valves will again be held open. If the lever should be turned to the left, as viewed in Figure 2, the disc will be so rotated that the shut-off valves 30 and 32 will be permitted to become closed, shut-off valve 31 remaining open. Spring 51 will again be compressed by member 44 being moved upwardly by the action of cam surfaces 46 and 47. When the operator's hand is released from the handle, the handle will snap back to its central position under the action of spring 51.

The bleeder valve 52 is associated with chamber 26 so that air can be removed from the hydraulic system when filling it with liquid or at any other time.

From the foregoing description it is apparent that when it is desired to employ the brakes to assist in steering, such can be accomplished solely by controlling the shut-off valves. By turning handle 48 to the left, as viewed from the front of the valve mechanism 8, the master cylinder device 6 will be cut off from the fluid motors of the brakes on the dirigible wheels and also from the fluid motors of the right driving wheel brakes. When the master cylinder is now operated, only the brakes on the left driving wheels will be applied. Thus the operator of the vehicle will be aided by this braking in turning the vehicle to the left. Steering will be greatly facilitated, particularly in the event the vehicle is on icy or very slippery ground where the dirigible wheels, although turned, will not cause efficient turning of the vehicle. It is also to be noted that when a rear wheel is braked to aid in steering, the front wheels are always free to turn. If it should be desired to employ the brakes in steering to the right, the handle may only be moved to the right end of the slot. This will cause the brakes on the dirigible wheels and the left driving wheel brakes to be cut off from the master cylinder device and when said device is operated, only the brakes on the right driving wheels will be applied.

No manual effort need be employed to bring the handle back to its normally inoperative position as this will be automatically accomplished by spring 51 whenever the hand is removed from the handle. If the handle is in its central position, all the shut-off valves will be open and thus they will not in any way interfere with the application of all the brakes on both the front and rear wheels of the vehicle.

Handle 48 is also employed to control the operation of the master cylinder device by air pressure and in order to accomplish this, there is an air metering valve embodied in the control valve mechanism 8. As shown in Figure 3, this metering valve is associated with the previously mentioned cylinder 45 of the casing member 25. The outer end of cylinder 45 is provided with a closure member 53 to which is connected conduit 15 coming from reservoir 13. Within chamber 54 of said member is an inlet valve element 55 for controlling communication between said chamber and the adjacent end of the cylinder by way of an opening 56. The valve 55 is normally held seated by a spring 57. Within cylinder 45 is a piston 58 having an exhaust passage 59 which communicates with an opening 60 in the cylinder leading to the atmosphere. The exhaust passage 59 is controlled by an exhaust valve element 62 which is mounted upon a stem 63 carried by the inlet valve element 55. The forward end of the cylinder ahead of the piston is connected by an opening 64 to conduit 19 leading to the two-way valve mechanism 20 shown in Figure 1. Between piston 58 and the previously referred to rotatable and axially movable member 44 which has one end journaled in the cylinder there is positioned a relatively strong spring 65 which is normally in an uncompressed condition when the exhaust valve element is open. The piston is held in engagement with this spring by a light spring 66 positioned between the forward end of the piston and member 53. The piston, when held against spring 65, causes exhaust valve element 62 to be opened so that the portion of the cylinder ahead of the piston is in communication with atmosphere.

When handle 48 is in the central position of the slot, the parts of the metering valve of the valve mechanism 8 will be in the positions shown in Figure 3. The inlet valve element 55 will be closed and the exhaust valve element 62 will be opened. Thus no air under pressure from the reservoir can enter the cylinder and conduit 19 leading to the power cylinder 12 for actuating the master cylinder device. When handle 48 is turned either to the left or to the right, member 44 will be moved axially upwardly as already mentioned, such movement being brought about by cam surfaces 46 and 47. This will result in piston 58 being moved through spring 65 so that the exhaust valve element 62 will be closed and then the inlet valve element 55 opened. The opening of valve element 55 will occur after disc 35 has permitted the controlled shut-off valves to become closed, said closing occurring when the handle has been moved only a portion of the distance toward either end of slot 50. When the inlet valve element 55 is opened, air under pressure will be admitted through passage 56 to conduit 19. This will operate the two-way valve 20 so that conduit 19 will be connected to conduit 17 only, thereby causing operation of the power cylinder 12 and actuation of the master cylinder device 6. When the master cylinder device is actuated, hydraulic pressure will be developed and either the right or the left driving wheel brakes only applied depending upon the direction of movement of the handle and the shut-off remaining open.

The extent of movement of the handle toward either end of the slot will control the amount of air under pressure admitted to the power cylinder and consequently the amount of hydraulic pressure developed. This result is obtained by the extent of compression of spring 65. When the inlet valve 55 is initially opened, air pressure will be built up ahead of piston 58 and will compress spring 65. As this spring is compressed, piston 58 will be so moved as to permit the inlet valve to again close. If spring 65 is further compressed, the valve element 55 will again be opened and additional air under pressure will be admitted until spring 65 is so compressed that inlet valve 55 will again become closed. Thus the air control valve acts in the well-known metering manner.

From the foregoing description of the entire system it is seen that operation of handle 48 in either direction from a central position will cause the master cylinder device to be operated and a brake on a driving wheel applied. The brake which is applied will depend upon the direction in which handle 48 is moved. To release the brakes all that is necessary is to remove the hand from the handle and permit spring 51 to return said handle to neutral position. When the handle assumes its neutral position the air which has been admitted to the power cylinder will be exhausted to atmosphere by the opening of the exhaust valve element 62.

Handle 48 is also so arranged that it can operate the metering valve without controlling the shut-off valves. This is accomplished by pushing downwardly on the outer end of the handle when it is in its central position. Under such conditions it will fulcrum on the lower edge of the slot and lift member 44 upwardly to thus compress spring 65 and operate the metering valve in the same manner as was done when member 44 was moved upwardly by cams 46 and 47. As shown in Figures 2 and 3, the edge of the slot at its center is rounded as indicated by numeral 67 in order that the handle can be easily rocked. The lever adjacent member 44 is also cut away at 68 and 69 to permit free pivotal movement of the handle. Although all the brakes can be applied by rocking handle 48, such is generally only operated when it is inconvenient to use the foot-controlled valve 14. By operating the foot-controlled valve, air under pressure from the reservoir will flow by way of conduits 16 and 18 to conduit 17 in the power cylinder to thus actuate the master cylinder device and cause hydraulic pressure to be developed to operate all the brakes, the shut-off valves remaining in open condition. When the foot-controlled valve is operated, the two-way valve will function to permit communication between conduits 18 and 17 and prevent any communication with conduit 19.

From the foregoing it is seen that in the system described there is provided a combined air-hydraulic brake actuating system whereby all the brakes may be applied by operation of a foot-controlled valve or all the brakes may be operated by moving a handle to operate another control valve. In addition to this, the handle may be so operated that only the brake of a driving wheel or wheels on one side of the vehicle may be applied.

If the vehicle upon which the braking system is applied does not have any dirigible wheels or if these dirigible wheels are not provided with brakes and it is desired to employ the system described to assist in steering, such can be accomplished by merely plugging passage 27 to which conduit 9 is connected. Conduit 10 will be connected to all the brakes on the right side of the vehicle and conduit 11 will be connected to all the brakes on the left side of the vehicle.

In Figure 6 there is schematically disclosed a braking system similar to that shown in Figure 1 but adapted also for controlling the brakes on a trailer vehicle which may be connected to the main or tractor vehicle such as that of Figure 1. In this figure the parts which are the same as those employed in the system of Figure 1 are indicated by the same reference characters. This is the entire braking system for the tractor vehicle which is shown as being provided with driving right and left tracks 3' and 4' instead of driving wheels. The driving members for these tracks are provided with brakes 5.

The trailer vehicle is also shown as one having tracks 70 although a wheeled one could be employed. The brakes 71 for these tracks are actuated by power cylinders 72 and are connected by conduits 73 and a relay valve 74 of any suitable known construction to the air pressure reservoir 75 carried on the trailer. This reservoir is connected by conduits 76 and 77 and a coupling 79 with the air reservoir 13 on the tractor. The relay valve is controlled by air pressure admitted through the foot-controlled valve 14 on the tractor, the connection comprising a conduit 80 (connected to conduit 18 leading from the foot-controlled valve) a coupling 81 and a conduit 82 connected to the relay valve.

The trailer brakes will not be affected in any way by the control of the tractor brakes when the combination control valve mechanism 8 is operated by handle 48 in a manner already described in connection with the system of Figure 1. When the foot-controlled valve 14, however, is operated, all the brakes on both the tractor and trailer will be applied since the air admitted by the foot-controlled valve will so operate the relay valve 74 that the air pressure in the trailer reservoir will be admitted to the power cylinders 72. With this braking system on a tractor-trailer combination vehicle, the operator may control all the brakes on both vehicles, all the brakes on the tractor vehicle only or selectively the brakes on the driving members of the tractor vehicle only in order to assist in steering.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In an actuating system, two fluid pressure operated actuating motors, a hydraulic pressure developing device, conduit means for placing said device in communication with each motor, two shut-off valves each of which is capable of preventing developed hydraulic pressure from operating a motor, means comprising a single movable member for selectively closing said valves, a source of air pressure, a power cylinder for actuating the hydraulic pressure developing device, conduit means between the source of air pressure and the power cylinder, a control valve for said last named conduit means, and other means operated by said single movable member for opening the control valve after it has closed said shut-off valves.

2. In an actuating system, three fluid pressure operated actuating motors, a hydraulic pressure developing device, conduit means for placing said device in communication with each motor, three shut-off valves each of which is capable of preventing developed hydraulic pressure from operating a motor, means comprising a single movable member for closing one of the three shut-off valves together with either of the remaining two shut-off valves, a source of air pressure, a power cylinder for actuating the hydraulic pressure developing device, conduit means between the source and the power cylinder, a control valve for said last named conduit means, and means for opening the control valve by said single movable member after it has closed two shut-off valves.

3. In an actuating system, two fluid pressure operated actuating motors, a hydraulic pressure developing device, conduit means for placing said device in communication with each motor, two shut-off valves each of which is capable of preventing developed hydraulic pressure from operating a motor, means for selectively closing said valves, a source of air pressure, a power cylinder for actuating the pressure developing device, conduit means between said source of air pressure and power cylinder, a control valve for said last named conduit means, means for opening the control valve, and a single member common to said shut-off valves and said control valve means for operating the means for closing the shut-off valves and the means for opening the control valve.

4. In an actuating system, two fluid pressure operated actuating motors, a hydraulic pressure developing device, conduit means for placing said device in communication with each motor, two shut-off valves each of which is capable of preventing developed hydraulic pressure from operating a motor, means for selectively closing said valves, a source of air pressure, a power cylinder for actuating the pressure developing device, conduit means between the source and power cylinder, a control valve for said last named conduit means, means for opening the control valve, a single member for operating the means for closing the shut-off valves and the means for opening the control valve, and means comprising a second control valve for placing the source of air pressure in communication with the power cylinder independently of the operation of the first control valve by the single member.

5. In an actuating system, two fluid pressure operated actuating motors, a hydraulic pressure developing device, conduit means for placing said device in communication with each motor, two shut-off valves each of which is capable of preventing developed hydraulic pressure from operating a motor, means for selectively closing said valves, a source of air pressure, a power cylinder for actuating the pressure developing device, conduit means between the source and power cylinder, a control valve for said last named conduit means, means for opening the control valve, and a single member for operating the means for selectively closing the shut-off valves and the means for opening the control valve, said member being movable in one direction from a predetermined position for first closing one shut-off valve and then opening the control valve and movable in another direction for first closing the other shut-off valve and then opening the control valve.

6. In an actuating system, three fluid pressure actuating motors, a hydraulic pressure developing device, conduit means for placing said device in communication with each motor, three shut-off valves associated with the conduit means each of which is capable of cutting off communication between the hydraulic pressure developing device and a motor, means comprising a member for controlling said valves and having a position where all the valves are open and other positions where one valve together with either one of the other two valves are selectively closed, a source of air pressure, a power cylinder for actuating the hydraulic pressure developing device, conduit means between the source and power cylinder, a control valve for said last named conduit means, means for opening the control valve, and a single member for operating the means for closing the shut-off valves and also operating the means for opening the control valve, said control valve being opened after the means for controlling the shut-off valves has been moved to either of its said other positions to cause closing of two of the shut-off valves.

7. In an actuating system, three fluid pressure actuating motors, a hydraulic pressure developing device, conduit means for placing said device in communication with each motor, three shut-off valves associated with the conduit means each of which is capable of cutting off communication between the hydraulic pressure developing device and a motor, means comprising a member for controlling said valves and having a position where all the valves are open and other positions where one valve together with either one of the other two valves are selectively closed, a source of air pressure, a power cylinder for actuating the hydraulic pressure developing device, conduit means between the source and power cylinder, a control valve for said last named conduit means, means for opening the control valve, a single member for operating the means for closing the shut-off valves and also operating the means for opening the control valve, said control valve being opened after the means for controlling the shut-off valves has been moved to either of its said other positions to cause closing of two of the shut-off valves, and other means comprising a second control valve for placing the power cylinder in communication with the source of air pressure independently of the first named control valve.

8. In an actuating system, two fluid pressure operated actuating motors, a hydraulic pressure developing device, conduit means for placing said device in communication with each motor, two shut-off valves each of which is capable of preventing developed hydraulic pressure from operating a motor, means for selectively closing said valves, a source of air pressure, a power cylinder for actuating the pressure developing device, conduit means between the source and power cylinder, a control valve for said last named conduit means, means for opening the control valve, a single member for operating the means for closing the shut-off valves and the means for opening the control valve, said member being movable in one direction from a predetermined position for first closing one shut-off valve and then opening the control valve and movable in another direction for first closing the other shut-off valve and then opening the control valve, and means for opening the control valve independently of the closing of the shut-off valves and by movement of the single member in a third direction.

9. In a brake actuating system for a vehicle having a driving member for each side thereof, brakes for the members, a hydraulic actuating means for actuating all the brakes, shut-off valves each of which is capable of preventing a brake from being actuated, an air pressure system comprising a control valve for operating the hydraulic actuating means, and a single member for selectively closing the shut-off valves and opening the control valve after either shut-off valve is closed.

10. In a brake actuating system for a vehicle having a driving member for each side thereof, brakes for the members, a hydraulic actuating means for actuating all the brakes, shut-off valves each of which is capable of preventing a brake from being actuated, an air pressure system comprising a control valve for operating the hydraulic actuating means, and a single member for selectively closing the shut-off valves and for opening the control valve after either shut-off valve is closed or for opening the control valve without closing a shut-off valve.

11. In a brake actuating system for a vehicle having a driving member for each side thereof, brakes for the members, a hydraulic actuating means for actuating all the brakes, two shut-off valves each of which is capable of preventing a brake from being actuated, an air pressure system comprising a control valve for operating the hydraulic actuating means, a single member for selectively closing the shut-off valves and opening the control valve, and means for operating the hydraulic actuating means independently of the operation of the control valve and comprising a second control valve associated with the air pressure system.

12. In a brake actuating system for a vehicle having a driving member for each side thereof, brakes for the members, a hydraulic actuating means for actuating all the brakes, two shut-off valves each capable of preventing a brake from being actuated, a rotatable cam for controlling the selective closing of the valves, an air pressure system including a control valve for operating the hydraulic actuating means, a reciprocable member for operating the control member, and means comprising a lever for rotating said cam and so reciprocating the member that either shut-off valve can be closed and the control valve subsequently opened.

13. In a brake actuating system for a vehicle having a driving member for each side thereof, brakes for the members, a hydraulic actuating means for actuating all the brakes, two shut-off valves each capable of preventing a brake from being actuated, a rotatable cam for controlling the selective closing of the valves, an air pressure system including a control valve for operating the hydraulic actuating means, a rotatable member connected to rotate the cam, a lever for rotating said member, means for axially shifting the rotating member when being rotated to a position causing closing of a shut-off valve, and means operable by the axial shifting of the rotatable member for opening the control valve.

14. In a brake actuating system for a vehicle having a driving member for each side thereof, brakes for the members, a hydraulic actuating means for actuating all the brakes, two shut-off valves each of which is capable of preventing a brake from being actuated, a rotatable cam for controlling the selective closing of the valves, an air pressure system including a control valve for operating the hydraulic actuating means, a rotatable member connected to rotate the cam, a lever for rotating said member, means for axially shifting the rotating member when being rotated to a position causing closing of a shut-off valve, means operable by the axial shifting of the rotatable member for opening the control valve, and means for shifting the rotatable member axially by the lever to open the control valve without rotation of the cam and closing of a shut-off valve.

15. In a brake actuating system for a vehicle having a driving member for each side thereof and a dirigible wheel, brakes for the members and wheel, a hydraulic actuating means for all the brakes, shut-off valves associated with the actuating means and each capable of preventing actuation of a brake, an air pressure system including a control valve for operating the hydraulic actuating means, and means including a single member for closing the shut-off valve for the brake on the dirigible wheel together with either of the shut-off valves for the brakes of the driving members and for operating the control valve of the air pressure system after the selected shut-off valves are closed.

16. In a brake actuating system for a vehicle having a driving member for each side thereof and a dirigible wheel, brakes for the members and wheel, a hydraulic actuating means for all the brakes, shut-off valves associated with the actuating means and each capable of preventing actuation of a brake, an air pressure system including a control valve for operating the hydraulic actuating means, and means including a single member for closing the shut-off valve for the brake on the dirigible wheel together with either of the shut-off valves for the brakes of the driving members and for operating the control valve of the air pressure system after the selected shut-off valves are closed or for operating the control valve independently without closing any of the shut-off valves.

17. In a brake actuating system for a vehicle, a driving member for each side thereof and a dirigible wheel, brakes for the members and wheel, a hydraulic actuating means for all the brakes, shut-off valves associated with the actuating means and each capable of preventing actuation of a brake, an air pressure system including a control valve for operating the hydraulic actuating means, means including a single manually operable member for closing the shut-off valve for the brake on the dirigible wheel together with either of the shut-off valves for the brakes of the driving members and for subsequently operating the control valve of the air pressure system, means permitting the control valve to be operated by the single member without closing the shut-off valves, and means comprising spring means for automatically returning the manually operable member to an inoperative position where the shut-off valves are open and the control valve is closed whenever the hand of the operator is removed therefrom with the lever in an operative position.

18. In a brake actuating system for a vehicle having a driving member for each side thereof, brakes for the members, a hydraulic actuating means for actuating all the brakes, two shut-off valves each capable of preventing a brake from being actuated, a rotatable cam for controlling the selective closing of the valves, said cam having a central position where both shut-off valves are open and positions on each side thereof for closing the valves, an air pressure system including a control valve for operating the hydraulic actuating means, a rotatable member connected to rotate the cam, a lever pivoted to the member for rotating said member, means for axially shifting the rotating member when it and the cam are being rotated by the lever in either direction to a cam position causing closing of a shut-off valve, means operable by the axial shifting of the rotatable member for opening the control valve, and means establishing a fulcrum for the lever to permit said lever to be so operated as to axially shift the rotatable member and open the control valve only.

19. In a brake actuating system for a vehicle having a driving member for each side thereof and a dirigible wheel, brakes for the members and wheel, a hydraulic actuating means for all the brakes, shut-off valves associated with the actuating means each of which is capable of preventing actuation of a brake, an air pressure system including a control valve for operating the hydraulic actuating means, and means for closing the shut-off valve for the brake on the dirigible wheel together with either of the shut-off valves for the brakes of the driving members and for operating the control valve of the air pressure system after the shut-off valves are closed or for operating the control valve without closing any of the shut-off valves, said last named means comprising a manually operable lever movable in one direction from a predetermined position for closing the shut-off valve of the brake on the dirigible wheel, the shut-off valve of one of the brakes of the driving members and subsequently opening the control valve, movable in another direction from said predetermined position for closing the shut-off valve of the brake on the dirigible wheel, the shut-off valve of the other brake of the driving members and subsequently opening the control valve and movable in a third direction for opening only the control valve.

WERNER F. BOLDT.